United States Patent

[11] 3,624,182

[72] Inventor Hideo Kubota
　　　　　　　Roseville, Mich.
[21] Appl. No. 54,629
[22] Filed July 13, 1970
[45] Patented Nov. 30, 1971
[73] Assignee General Motors Corporation
　　　　　　　Detroit, Mich.

[54] ABS POLYMER BLENDS FOR HIGH-SHEAR PROCESSING
　　　6 Claims, No Drawings
[52] U.S. Cl. .................................................... 260/876 R,
　　　　　　　260/893, 260/894, 264/211, 264/349
[51] Int. Cl. ..................................................... C08f 41/12,
　　　　　　　C08f 29/56
[50] Field of Search .......................................... 260/893,
　　　　　　　876, 894; 264/211, 349

[56] References Cited
　　　FOREIGN PATENTS
1,024,778　4/1966　Great Britain ................ 260/893

Primary Examiner—Murray Tillman
Assistant Examiner—C. Seccuro
Attorneys—William S. Pettigrew and George A. Grove ABSTRACT: When a small amount of a relatively low molecular weight terpolymer of styrene, acrylonitrile and a saturated higher fatty alcohol ester of acrylic acid or methacrylic acid is incorporated into a conventional high impact grade ABS thermoplastic resin, the resin blend may be more readily subjected to high-shear forming processes to produce high-quality parts. The presence of the terpolymer in an ABS resin melt improves melt flow properties in extrusion or injection molding operations by markedly reducing melt viscosity and increasing melt stability.

ABS POLYMER BLENDS FOR HIGH-SHEAR PROCESSING

This invention relates to high-shear processing of acrylonitrile-butadiene-styrene (ABS) resins, such as injection molding or extrusion operations. More particularly, this invention relates to the use of blends of a major portion of a conventional ABS resin with a minor portion of a terpolymer of styrene, acrylonitrile and certain acrylate-fatty alcohol esters, which terpolymer markedly reduces the melt viscosity of the blend, particularly at high shear rates.

The utility of ABS engineering plastics is well recognized. These hard, tough, durable synthetic resins find many applications and they may be formed by any of a number of processes. ABS resins are two-phase materials consisting of rubbery polybutadiene particles in a hard styrene-acrylonitrile plastic matrix. Generally, the ABS resin contains 20 to 30 percent polybutadiene and the balance styrene-acrylonitrile copolymer. Typically, acrylonitrile makes up 22 to 26 percent or more by weight of the copolymer. The resins may be prepared by simply mixing polybutadiene with styrene-acrylonitrile copolymer, or some styrene-acrylonitrile may be chemically grafted to the polybutadiene.

ABS resins have weight average molecular weights from around 70,000 to 250,000. High impact strength ABS resins typically have relatively high molecular weights and a higher density of network structures between the polybutadiene rubber molecules and the styrene-acrylonitrile copolymer plastic portion. ABS resin articles, including those of high-impact resin, are often formed or desired to be formed by extrusion or by injection molding. In these processes the resin is initially melted by heating to a temperature of about 450° to 500° F. and then extruded through a die or injected into a mold. Molten ABS resins, and particularly high impact grade ABS resins, have relatively high melt viscosities over a wide range of shear rates. This high viscosity makes it very difficult to injection mold high impact grade ABS resins below their decomposition temperature. Moreover, there are limitations on the shear rate at which ABS resins can be extruded or injection molded. If the molten resin is sheared at too high a rate, melt fracture occurs. Melt fracture is an instability in resin melt flow through a die starting at the entry to the die. It leads to unsightly surface irregularities on the molded article. Problems with painting, electroplating and long term service under load are encountered. Thus the high ABS melt viscosity limits the ease and rate of production of ABS resin articles by high-shear processes, such as injection molding or extrusion. This limitation is particularly pronounced in those high molecular weight ABS resins which have desirable high impact strength.

Accordingly, it is an object of the present invention to provide an ABS resin-terpolymer additive blend particularly suitable for use in high shear forming processes and injection molding.

It is another object of the present invention to provide a polymeric plasticizing material for mixing with ABS resins particularly for use in high shear forming processes. The polymeric additive is to have the effect of reducing the melt viscosity of ABS resins and increasing the melt stability of the resin, particularly at high shear rates.

In accordance with a preferred embodiment of my invention, these and other objects are accomplished by providing a terpolymer of acrylonitrile, styrene and a saturated higher fatty alcohol ester of acrylic acid or methacrylic acid. Examples of suitable terpolymers are styrene-acrylonitrile-stearyl methacrylate, styrene-acrylonitrile-stearyl acrylate and styrene-acrylonitrile-lauryl methacrylate. The number average molecular weight of these terpolymers should be at least about 5,000. The terpolymer is blended with a conventional ABS resin in the amount of about 5 to 20 percent by weight of the ABS resin-terpolymer mixture. The ABS resin-terpolymer additive blend is then mixed and heated to a suitable molding or extrusion temperature, such as about 425° to 500° F. The resin melt is readily extruded or injected into a mold cavity under high pressure at a high shear rate. The terpolymer additive is compatible with ABS resins and markedly reduces the melt viscosity of the blend, permitting high shear rates and maintaining suitable melt stability. These ABS resin-terpolymer blends may also contain a small amount of conventional lubricants which typically enhance the flow properties of ABS resin melts at low shear rates but have little effect on melt viscosity at high shear rates.

These and other objects and advantages of my invention will be more fully understood in view of a detailed description thereof which follows.

Terpolymer additives which are useful in accordance with my invention are those formed by the interpolymerization of styrene, acrylonitrile and esters of acrylic acid or methacrylic acid and certain saturated high fatty alcohols. In accordance with this invention, higher fatty alcohols are those straight-chain alcohols having 12 to 18 carbon atoms in the molecule. Particularly preferred are the lauryl and stearyl alcohol esters of acrylic and methacrylic acid.

The terpolymer additives can be prepared by solution polymerization in carbon tetrachloride which acts both as solvent and chain transfer agent. The free radical polymerization can be initiated, for example, by azo-iso-butyronitrile. The polymerization is carried out under nitrogen atmosphere and the reaction temperature is easily kept at the boiling temperature of carbon tetrachloride (76° C.). Preferably, styrene and acrylonitrile are charged to the solution for polymerization in such proportions that acrylonitrile constitutes about 22 percent to 28 percent of the sum of these two monomers. The fatty alcohol ester of acrylic acid or methacrylic acid is added in an amount equivalent to about ½ to 10 mole percent of the total monomer mixture for polymerization. The specific proportions of the mer units of the resulting terpolymer are not specifically known, but the terpolymer should have a number average molecular weight, in accordance with this invention, of at least about 5,000. Solution polymerization can be used to produce these terpolymers in the molecular weight range of about 5,000 to about 30,000. Other well-known polymerization techniques, such as bulk or emulsion polymerization, will produce higher molecular weight terpolymers.

A few specific examples of the preparation of suitable terpolymers and their use in ABS resins will further serve to illustrate the invention.

EXAMPLE I

A solution of 1.31 moles (136 grams) of styrene, 0.74 mole (39 grams) acrylonitrile, 0.059 mole (20 grams) stearyl methacrylate and 1.20 grams azo-iso-butyronitrile were dissolved in 460 milliliters of carbon tetrachloride. The solution was refluxed for 8 hours under nitrogen. The polymeric product was precipitated from the solution by a large amount of methanol. It was washed with cold methanol and dried. The terpolymer was found to have a number average molecular weight of about 17,000. Infrared spectrographic analysis detected the presence of styrene, acrylonitrile and stearyl methacrylate moieties in the terpolymer product. This terpolymer No. 1 was blended in varying proportions, from 8.2 percent by weight to 28.5 percent by weight of the blend, with a pure commercial high impact grade acrylonitrile-butadiene-styrene resin.

The pure commercial resin had such a high melt viscosity that it could not be injection molded even into a small part such as a heat deflection test sample. Examination of the resin revealed that it contained about 65 percent by weight free (acetone extractable) styrene-acrylonitrile copolymer (SAN) and that the number average molecular weight of the SAN by gel permeation chromatography was about 130,000. However, blends of this ABS resin and others with the terpolymers of my invention could be satisfactorily injection molded at 465° F.

In order that the properties of my terpolymer-ABS resin blends could be evaluated more quantitatively and more satisfactorily compared with conventional ABS resins, viscosity measurements at 240° C. (464° F.) with increasing shear rates were made using an Instron Capillary Rheometer. The viscosity data obtained with above ABS resin-terpolymer No. 1 blends is summarized in the table following example III. As is seen in the table and as will be discussed in more detail below, my terpolymer-ABS resin blends displayed markedly lower melt viscosity, particularly at high shear rates, than were obtained with the pure commercial ABS resin or with the same commercial ABS resin containing about 2.1 percent by weight of a commercial rosin lubricant.

EXAMPLE II

A solution of 1.39 moles (136 grams) styrene, 0.74 mole (39 grams) acrylonitrile, 0.015 mole (4.9 grams) stearyl acrylate and 3.0 grams azo-iso-butyronitrile in 500 milliliters in carbon tetrachloride was prepared. The solution was heated at reflux for 12 hours. The polymer was isolated, purified and dried as in example I. The number average molecular weight of the polymer was determined to be about 12,000. Infrared spectrographic analysis detected the presence of styrene, acrylonitrile and stearyl acrylate monomeric units in the the terpolymer product.

This terpolymer No. 2 (18.5 parts) was mixed with 81.5 parts of the commercial ABS resin on a heated two-roll mill at 350° F. for 15 minutes. Viscosity measurements of this blend at 240° C. and at increasing shear rates were determined as in example I. The results of these viscosity measurements are summarized in the table below.

EXAMPLE III

A solution of 0.62 mole (64.5 grams) styrene, 0.45 mole (24 grams) acrylonitrile, 30 grams lauryl methacrylate (commercial grade—not pure) and 1.5 grams azo-iso-butyronitrile in 500 milliliters carbon tetrachloride was prepared. The solution was heated at reflux under nitrogen for 12 hours. The resulting polymer was isolated, purified and dried as in example I. It was determined to have a number average molecular weight of about 8,000. Infrared analysis of the isolated polymer indicated the presence of styrene-acrylonitrile and lauryl methacrylate monomeric units in the polymer. This terpolymer No. 3 (18.5 parts) was blended with 81.5 parts of the commercial ABS resin on a heated two-roll mill at 350° F. for 15 minutes and viscosity measurements at 240° C. at increasing shear rates made as described in example I. The results of the viscosity measurements are summarized in the table immediately below.

only a very modest effect in decreasing melt viscosity at a shear rate of 2,000 of higher seconds$^{-1}$.

In sharp contrast, however, the viscosity data above and actual injection molding experience both show that addition of my terpolymers to commercial ABS resins produces desirable low melt viscosities at high shear rates, particularly above 2,000 seconds$^{-1}$. Moreover, these ABS resin-terpolymer blends resisted or entirely eliminated melt fracture at these high shear rates up to 15,000 seconds$^{-1}$.

Preferably, the terpolymers of this invention are employed in amounts equivalent to 5 to 20 percent by weight of the ABS resin-terpolymer mixture. Quantities lower than 5 percent by weight do not markedly improve melt properties at high shear rates. Amounts in excess of 20 percent by weight adversely affect the physical and mechanical properties of the formed ABS article.

Typical extrusion and injection molding processes with ABS resins are conducted at shear rates of 200 to 3,000 seconds$^{-1}$ or higher. Of course, the higher the shear rate the more production can be obtained.

Commercial lubricants for ABS resins may be employed in combination with the terpolymers of my invention to obtain benefits at low shear rates if desired. Examples of such lubricants include rosin, stearic acid and other fatty acids, fatty acid esters and metal stearates, such as lead stearate, cadmium stearate, barium stearate, calcium stearate and zinc stearate. As exemplified in the above table, such lubricants in combination with ABS resin or with my ABS resin-terpolymer blends reduce melt viscosities at low shear rates but have little or no effect at high shear rates.

As indicated above, it is preferred that my styrene-acrylonitrile-acrylic acid-fatty alcohol ester terpolymers have a number average molecular weight of at least about 5,000. In general, the upper limit on the molecular weight will be that obtainable by polymerization techniques. In solution polymerization the upper limit is about 30,000. Other polymerization techniques produce much higher molecular weight terpolymers. This upper limit is not critical to the successful practice of my invention. However, it has been observed that it is desirable to blend relatively low molecular weight terpolymer additives with high molecular weight ABS resins and vice versa. In other words, when extremely high molecular weight ABS resins ($M_n$ of free SAN portion = 100,000 to 200,000) are to be formed by a high shear rate process, maximum benefits of my invention will be obtained using a relatively low molecular weight terpolymer ($M_n$ = 5,000 to 30,000). If lower molecular weight ABS resins ($M_n$ of

VISCOSITY (POISE) AT 240° C.

| Shear rate (second $^{-1}$) | ABS (pure) | ABS plus lubricant [1] | Terpolymer #1 | | | 28.5% plus lubricant | Terpolymer #2, 18.5% | Terpolymer #3, 18.5% |
| --- | --- | --- | --- | --- | --- | --- | --- | --- |
| | | | 8.2% | 18.5% | 28.5% | | | |
| $4\times10^2$ | $8.7\times10^3$ | $7.5\times10^3$ | $7.7\times10^3$ | $6.0\times10^3$ | $4.4\times10^3$ | $3.8\times10^3$ | $3.5\times10^3$ | $5.0\times10^3$ |
| $1\times10^3$ | $3.9\times10^3$ | $3.6\times10^3$ | $3.4\times10^3$ | $2.8\times10^3$ | $2.1\times10^3$ | $2.0\times10^3$ | $2.15\times10^3$ | $2.6\times10^3$ |
| $2\times10^3$ | $2.1\times10^3$ | $2.05\times10^3$ | $1.9\times10^3$ | $1.6\times10^3$ | $1.3\times10^3$ | $1.29\times10^3$ | $1.36\times10^3$ | $1.55\times10^3$ |
| $4\times10^3$ | M.F. | M.F. | $1.05\times10^3$ | $9.0\times10^2$ | $7.3\times10^2$ | $7.2\times10^3$ | $8.2\times10^2$ | $9.0\times10^3$ |
| $5\times10^3$ | M.F. | M.F. | M.F. | $7.4\times10^2$ | $6.3\times10^2$ | $6.1\times10^3$ | $6.95\times10^2$ | $7.4\times10^3$ |
| $8\times10^3$ | M.F. | M.F. | M.F. | $5.0\times10^2$ | $4.3\times10^2$ | $4.2\times10^3$ | $4.8\times10^2$ | $5.0\times10^2$ |
| $1.5\times10^4$ | M.F. | M.F. | M.F. | M.F. | $2.9\times10^2$ | $2.8\times10^3$ | $2.9\times10^2$ | $2.9\times10^2$ |

[1] Commercial lubricant (approximately 2.1% by weight).

NOTE.—M.F.=Melt Fracture observed.

The viscosity data in the above table reflects the experience one observes in high-shear processes with the commercial high impact grade ABS resins and the ABS resin-terpolymer compositions of my invention. It will be noted that with each material tested, the melt viscosity decreased with increasing shear rate. However, both the pure ABS resin and the ABS resin containing the rosin lubricant yielded viscosity data only at shear rates from 400 seconds$^{-1}$ to 2,000 seconds$^{-1}$. At higher shear rates melt fracture occurred, which in a shear forming process would prohibit satisfactory injection molding. While the commercial rosin lubricant improved flow properties by decreasing melt viscosity at low shear rates, it did nothing to prevent melt fracture at high shear rates and had free SAN portion = 50,000 to 100,000) are to be formed they will be advantageously blended with higher molecular weight terpolymers ($M_n$ = 100,000 to 200,000). The explanation for this observation may be that it is apparently the molecular weight of the SAN component of an ABS resin which most significantly affects the resin's melt viscosity at high shear rates. When a terpolymer of this invention is selected which has a molecular weight different than the molecular weight spread of the SAN component, the molecular weight distribution of the blend is broadened. The average molecular weight of SAN-like materials is broadened and the melt viscosity of the blend at high shear rates is significantly reduced.

While my invention has been described in terms of a few specific embodiments thereof, it will be appreciated that other forms could readily be adapted by one skilled in the art. Accordingly, the scope of my invention is to be considered limited only by the following claims.

What is claimed is:

1. In the method of forming acrylonitrile-butadiene-styrene (ABS) resins into useful articles by melting a said resin, subjecting said resin to high-shear processing and then cooling and solidifying said resin in a predetermined desired shape, the improvement comprising incorporating a terpolymer additive into said ABS resin prior to said processing in an amount of 5 to 20 percent by weight of the ABS resin-terpolymer mixture, said terpolymer being styrene-acrylonitrile-X, wherein X is a material selected from the group consisting of acrylic acid esters and methacrylic acid esters of saturated straight-chain fatty alcohols, said fatty alcohols containing 12 to 18 carbon atoms, said terpolymers having a number average molecular weight greater than about 5,000, the effect of the presence of said terpolymer in said ABS resin during high-shear processing being to reduce the melt viscosity at high shear rates.

2. The improved process of claim 1 wherein said terpolymer which is employed is styrene-acrylonitrile-stearyl methacrylate.

3. The improved process of claim 1 wherein the said terpolymer which is employed is styrene-acrylonitrile-stearyl acrylate.

4. The improved process of claim 1 wherein said terpolymer which is employed is styrene-acrylonitrile-lauryl methacrylate.

5. A method of forming high impact grade acrylonitrile-butadiene-styrene (ABS) resins into useful articles by the high-shear processing of a melt of said ABS resin comprising preparing a molten mixture of about 80 to 95 parts by weight of a said ABS resin and about five to 20 parts by weight of a styrene-acrylonitrile-X terpolymer, wherein X is a material selected from the group consisting of acrylic acid esters and methacrylic acid esters of saturated straight-chain fatty alcohols, said fatty alcohols containing 12 to 18 carbon atoms, said terpolymers having a number average molecular weight of about 5,000 to 30,000, said ABS resin containing a styrene-acrylonitrile copolymer portion having a number average molecular weight of about 100,000 to 200,000, subjecting said molten mixture to a shearing force to form it into a desired predetermined configuration and cooling said molten mixture to solidify it.

6. A method as in claim 5 wherein X is a monomer taken from the group consisting of stearyl acrylate, stearyl methacrylate, lauryl acrylate and lauryl methacrylate.

* * * * *

PO-1050
(5/69)

UNITED STATES PATENT OFFICE
CERTIFICATE OF CORRECTION

Patent No. __3,624,182__   Dated __November 30, 1971__

Inventor(s) __Hideo Kubota__

It is certified that error appears in the above-identified patent and that said Letters Patent are hereby corrected as shown below:

Column 1, line 32, "450°" should be -- 425° --.

Column 3, in the table entitled "Viscosity (Poise) at 240° C." the footnote -- 1 -- reading "Commercial lubricant (approximately 2.1% by weight)." should also refer to the column entitled "28.5% plus lubricant". Column 4, line 2, after "2,000" change "of" to -- or --.

Signed and sealed this 16th day of May 1972.

(SEAL)
Attest:

EDWARD M.FLETCHER,JR.
Attesting Officer

ROBERT GOTTSCHALK
Commissioner of Patents